US005835577A

United States Patent [19]

Disanto et al.

[11] Patent Number: 5,835,577
[45] Date of Patent: Nov. 10, 1998

[54] MULTI-FUNCTIONAL PERSONAL TELECOMMUNICATIONS APPARATUS

[75] Inventors: Frank J. Disanto, North Hills; Denis A. Krusos, Lloyd Harbor, both of N.Y.

[73] Assignee: Copytele, Inc., Huntington Station, N.Y.

[21] Appl. No.: 636,543

[22] Filed: Apr. 25, 1996

[51] Int. Cl.⁶ .................................................. H04M 11/00
[52] U.S. Cl. ................................. 379/93.19; 379/93.11; 379/100.15; 379/110.01
[58] Field of Search .............................. 379/93–100, 90, 379/110, 67, 88, 89, 90.01, 93.01, 93.05–93.11, 93.14, 93.17–93.29, 93.37, 110.01, 100.01, 100.13–100.16; 348/14–19; 178/17 R, 18

[56] References Cited

U.S. PATENT DOCUMENTS

| | | |
|---|---|---|
| 4,655,897 | 4/1987 | DiSanto et al. . |
| 4,732,830 | 3/1988 | DiSanto et al. . |
| 4,754,335 | 6/1988 | Izawa et al. ............................. 379/100 |
| 4,870,677 | 9/1989 | DiSanto et al. . |
| 5,040,206 | 8/1991 | Tokumasu et al. ...................... 379/100 |
| 5,450,069 | 9/1995 | DiSanto et al. . |
| 5,467,107 | 11/1995 | DiSanto et al. . |
| 5,608,786 | 3/1997 | Gordon ................................. 379/100 |

FOREIGN PATENT DOCUMENTS

| | | | |
|---|---|---|---|
| 58-54794 | 3/1983 | Japan ...................................... 379/100 |
| 64-1363 | 1/1989 | Japan ...................................... 379/100 |
| WO90/04299 | 4/1990 | WIPO ..................................... 379/110 |

OTHER PUBLICATIONS

TW101 Telewriting Terminal Pen Telephone operation manual, received by PTO on Feb. 14, 1994.

*Primary Examiner*—Wing F. Chan
*Attorney, Agent, or Firm*—Plevy & Associates

[57] ABSTRACT

The present apparatus integrates a user interactive display with multiple functional telecommunications capabilities such as scanning, facsimile and telephonic capabilities. The display includes a touch sensitive screen overlay on an electrophoretic display and a handwriting controller for recognizing handwritten impressions on the touch sensitive screen overlay. The scanning, facsimile and telephonic capabilities are manipulated by the user through the interactive display. The apparatus also includes additional interface capabilities to compatible printers and remote computers as well as networking capabilities to remote faxes, cellular communications and pagers. Operations through the additional capabilities are also manipulated by the user interactive display.

63 Claims, 19 Drawing Sheets

TO RECEIVE A FAX MESSAGE OR COMPUTER MESSAGE
DURING A PHONE CALL
PRESS START
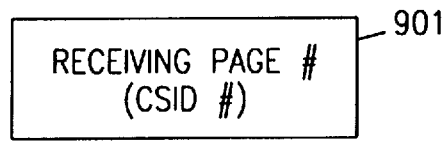
RECEIVING PAGE # (CSID #) — 901
AFTER RECEPTION IS COMPLETE
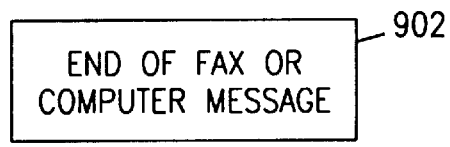
END OF FAX OR COMPUTER MESSAGE — 902
IF TELEPHONE IS "ON HOOK"— MACHINE DISCONNECTS FROM LINE
IF TELEPHONE IS "OFF HOOK"— MACHINE SENDS VOICE REQUEST TO OTHER SIDE
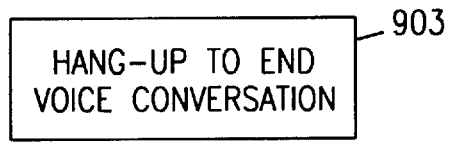
HANG-UP TO END VOICE CONVERSATION — 903
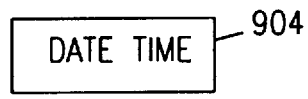
DATE TIME — 904
*FIG. 9*

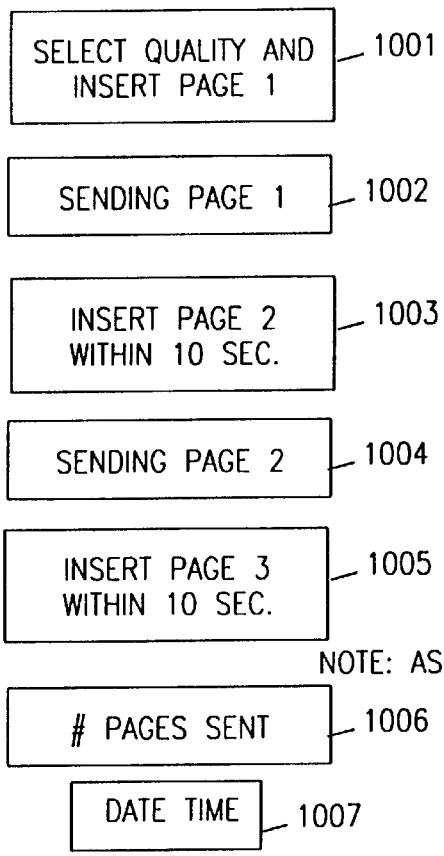

TO TRANSMIT A FAX MESSAGE DURING A PHONE CALL
PRESS SEND FAX

SELECT QUALITY AND INSERT PAGE 1 — 1001

SENDING PAGE 1 — 1002

INSERT PAGE 2 WITHIN 10 SEC. — 1003

SENDING PAGE 2 — 1004

INSERT PAGE 3 WITHIN 10 SEC. — 1005

NOTE: ASSUME NO. PAGE 3

PAGES SENT — 1006

DATE TIME — 1007

*FIG. 10*

TO LISTEN TO VOICE MESSAGE RECEIVED
NOTE: BLINKING RED LED NEXT TO VOICE MESSAGES RECEIVED INFORMS USER THAT NEW VOICE MESSAGES ARE AVAILABLE

PRESS "VOICE MESSAGES RECEIVED"

NOTE: AS EACH VOICE MESSAGE IS PLAYED (ON THE SPEAKER IF ON HOOK, OR THROUGH THE HANDSET IF OFF HOOK), THE DATE AND TIME THE MESSAGE WAS RECORDED IS DISPLAYED

MESSAGE RECORDED DATE TIME — 1101

NOTE: AFTER LAST MESSAGE IS PLAYED.

DATE TIME — 1102

*FIG. 11*

TO VIEW FAX MESSAGES RECEIVED

NOTE: BLINKING RED LED NEXT TO VOICE MESSAGES RECEIVED INFORMS USER THAT NEW FAX MESSAGES ARE AVAILABLE FOR VIEWING

PRESS "MESSAGES RECEIVED"

NOTE: ENTIRE DOCUMENT APPEARS ON SCREEN

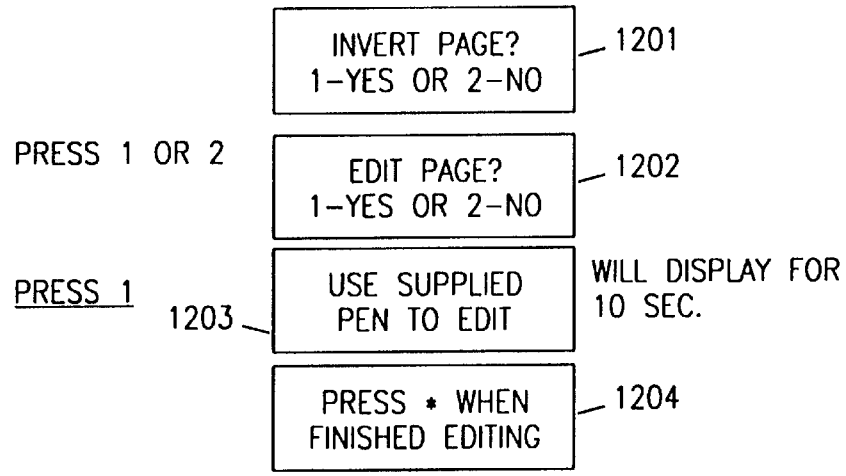

THE FOLLOWING NOTES APPEAR ON THE DISPLAY
1) 'FAX PAGES ARE SENT AFTER ALL PAGES ARE VEIWED'
2) 'TO CLEAR PHONE NUMBER PRESS STOP'
TO DISPLAY SAME PAGE UNSELECTED

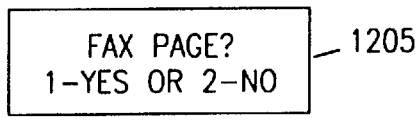

FIG. 12

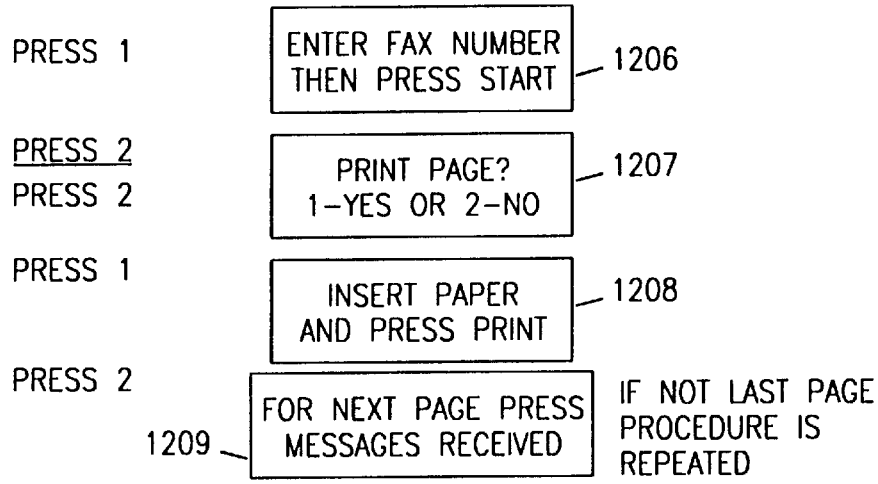

FIG. 13

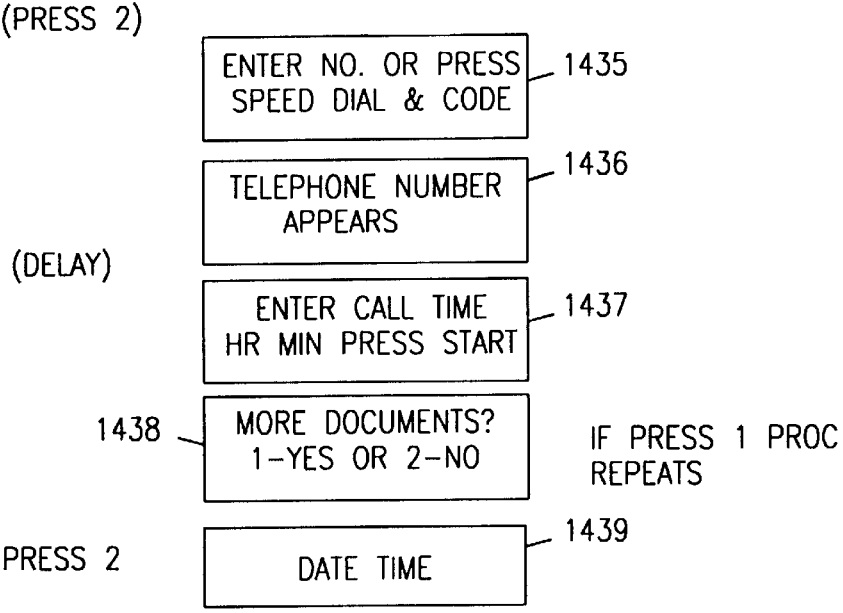
FIG. 18
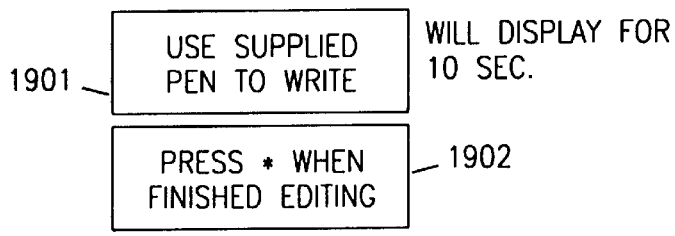
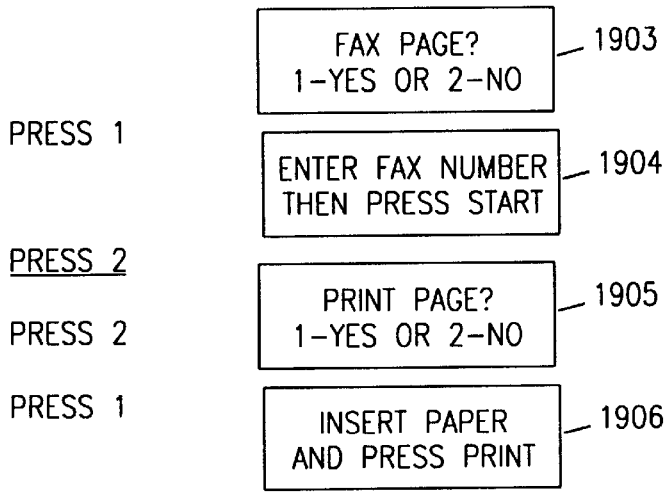
FIG. 19

TO VIEW COMPUTER MESSAGES RECEIVED

NOTE: BLINKING RED LED NEXT TO COMPUTER MESSAGES RECEIVED INFORMS USER THAT NEW COMPUTER MESSAGES ARE AVAILABLE FOR VIEWING

PRESS 'COMPUTER MESSAGES RECEIVED'

NOTE: ENTIRE DOCUMENT APPEARS ON SCREEN

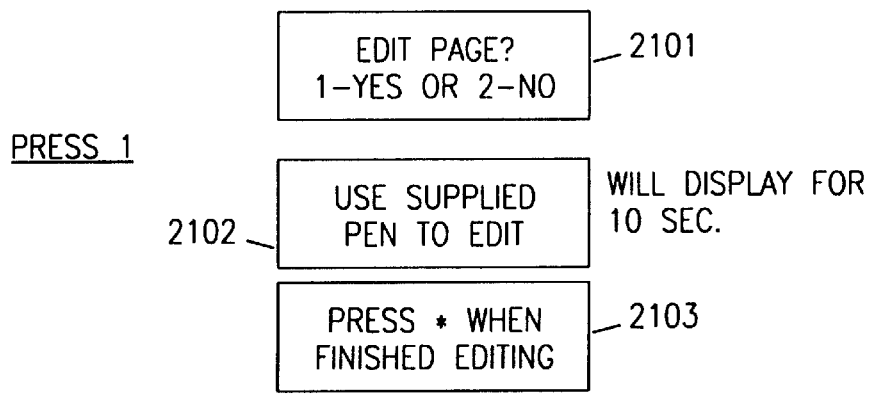

PRESS 1

THE FOLLOWING NOTES APPEAR ON THE DISPLAY
1) 'FAX PAGES ARE SENT AFTER ALL PAGES ARE VEIWED'
2) 'TO CLEAR PHONE NUMBER PRESS STOP'
TO DISPLAY THE SAME PAGE UNEDITED

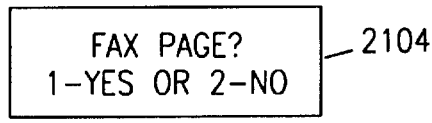

*FIG. 21*

SCANNER TO COMPUTER
NOTE 1: COMPUTER MUST BE ATTATCHED TO SCANNER PORT ON MODEL L
NOTE 2: COMPUTER MUST RUN COPY TO SCANNER TO COMPUTER APPLICATED.
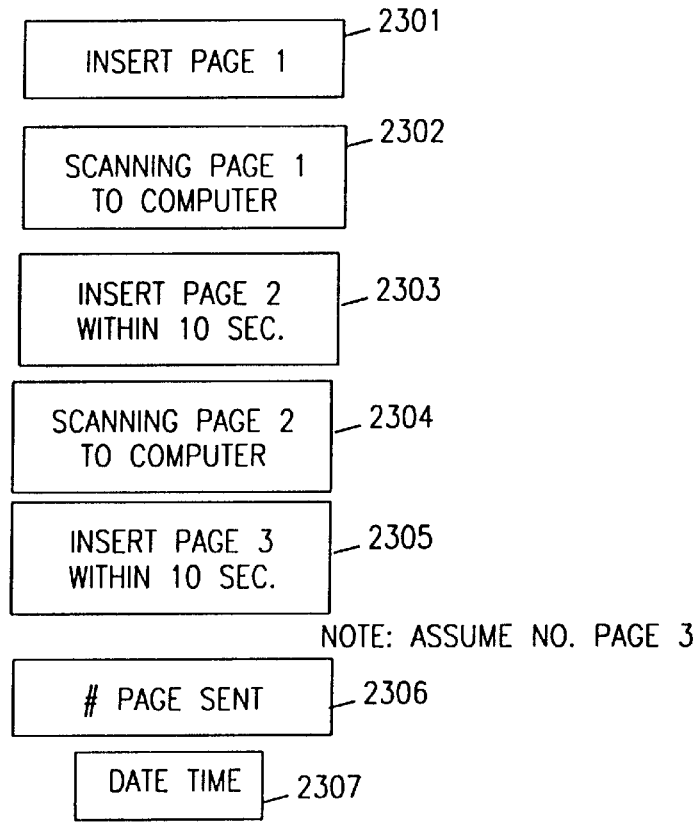
FIG. 23
VIEW/SELECT SPEED DIALING DIRECTORY
PRESS 'SPEED DIAL' (WHEN PHONE IS NOT IN USE).
SPEED DIALING DIRECTORY APPEARS ON DISPLAY.
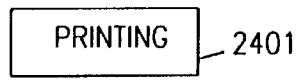
PRESS SPEED DIAL 
FIG. 24

PRESS 'REDIAL'
(LAST PHONE CALL WAS A VOICE CALL)
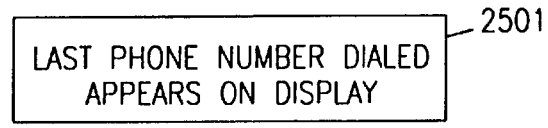
LAST PHONE NUMBER DIALED APPEARS ON DISPLAY — 2501
DATE TIME — 2501
FIG. 25
PRESS 'REDIAL'
(LAST PHONE CALL WAS A FAX CALL)
SELECT QUALITY AND INSERT PAGE 1 — 2601
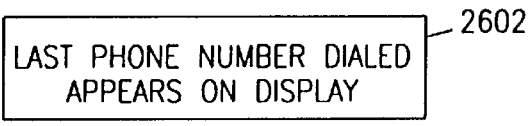
LAST PHONE NUMBER DIALED APPEARS ON DISPLAY — 2602
SENDING PAGE 1 — 2603
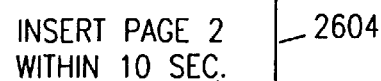
INSERT PAGE 2 WITHIN 10 SEC. — 2604
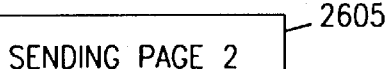
SENDING PAGE 2 — 2605
INSERT PAGE 3 WITHIN 10 SEC. — 2606
NOTE: ASSUME NO. PAGE 3
PAGES SENT — 2607
DATE TIME — 2608
FIG. 26

MULTI-FUNCTIONAL PERSONAL TELECOMMUNICATIONS APPARATUS

FIELD OF THE INVENTION

This invention relates to a telecommunications apparatus with multifunctional capabilities and more particularly to an apparatus which integrates the multifunctional capabilities through user interaction with a touch sensitive screen overlay on an interface display.

BACKGROUND OF THE INVENTION

In the present technology there are multifunctional telecommunications products with or without telephone operations integrated with various capabilities such as fax/data modem operations, copying, data storage and transmission, hardcopy scanning into electronic form, computer printing, and facsimile transmissions. However, these multifunctional devices do not provide operational capabilities through an integrated touch sensitive screen overlay on an electrophoretic display panel facilitating user interaction and employed as an interface display.

Electrophoretic displays (EPIDS) are now well known. A variety of display types and features are taught in several patents assigned to the assignees herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. Nos. 4,870,677 and 5,450,069, entitled DATA/FACSIMILE TELEPHONE SUBSET APPARATUS INCORPORATING ELECTROPHORETIC DISPLAYS, describe a telephone with an electrophoretic display to generate various keyboard formats operated in conjunction with a position sensitive overlay to permit keyboard type inputs through the electrophoretic display of a keyboard. U.S. Pat. No. 5,467,107, entitled ELECTROPHORETIC DISPLAY PANEL WITH SELECTIVE CHARACTER ADDRESSABILITY, describes an electrophoretic display in which individual characters on a line of display can be selectively erased and rewritten without materially disturbing the appearance of other image characters of that line which remain the same from one frame to the next. Many other patents regarding such displays are also assigned to Copytele, Inc.

As described in the foregoing patents, essentially, an electrophoretic display apparatus includes a planar transparent member having disposed on a surface a plurality of vertical conductive lines to form a grid of lines in the Y direction. On top of the grid of vertical lines there is disposed a plurality of horizontal lines which are positioned above the vertical lines and insulated therefrom by a thin insulating layer at each of the intersection points. Spaced above the horizontal and vertical line pattern is a conductive plate. The space between the conductive plate and the X and Y line patterns is filled with an electrophoretic dispersion containing chargeable pigment particles. When a voltage is impressed between the X and Y lines, pigment particles, which are located in wells or depressions between the X and Y pattern, are caused to migrate towards the conductive plate and are deposited upon the conductive plate in accordance with the bias applied to the X and Y line conductors. There is described various electrophoretic dispersions which are suitable for operating with the display, as well as techniques for fabricating the display. In this manner such displays can be fabricated to contain large effective display surfaces while being relatively thin and which are capable of high resolution at very low power.

The foregoing patents also describe use of pressure or position sensitive overlays in conjunction with the electrophoretic displays for providing users the ability to provide system inputs by manipulating images on the electrophoretic displays. Although a pressure sensitive display is described, there are many other techniques which will allow a touch overlay or touch operation, such as LED arrays or capacitive sensing devices. These devices will detect the position or pressure imparted by a user at various areas of the display, and hence, such an overlay is not directed solely to pressure. In regard to pressure overlays, they are furnished by many companies and are conventional components. See, for example, a product distributed by Tektronics Inc. of Beaverton, Oreg., which is capable of detecting touch or pressure with high resolution. Moreover, the pressure overlays can be fabricated for sensitivity to high pressure point type contacts, such as from a pen, and insensitive to low pressure from large area contact, such as from a hand. Thus, there are various overlays which can be integrated with an electrophoretic display for enabling a user to implement line or character displays, a code or other sequence by contacting an area of the display.

It is an object of the present invention to provide a unique user interactive, multifunctional telecommunications apparatus. More particularly, it is an object of the present invention to provide a multifunctional telecommunications apparatus with an integrated interface display manipulated by a touch sensitive screen overlay, on a major surface thereof, to facilitate user interactive control of the multifunctional capabilities.

SUMMARY OF THE INVENTION

The present multifunctional telecommunications apparatus employs an interface display, including an electrophoretic display with a touch sensitive screen overlay, for user inputs to manipulate the electrophoretic display and other capabilities of the present apparatus. An integrated fax controller with configuration software stored in ROM provides facsimile operations through a fax and data modem coupled to an interface to communications networks including public switched telephone network, on-line internet services, cellular phone communications and pagers. The fax controller is coupled to a scanner interface for scanning information on documents into the apparatus for further processing. The present apparatus also includes interface connections to compatible printers and remote computers which can be manipulated by the fax controller or the user interactive display. Document memory storage is provided for information processed by the fax controller to facilitate operations such as unattended reception of faxes and broadcast fax transmissions. The document memory storage is also used to retain information provided through or manipulated by the display through the touch sensitive screen overlay.

The display includes handwriting logic responsive to user applied information on the touch sensitive screen for sending signals representative of the user applied information to the electrophoretic display for displaying the user applied information. A software configured handwriting and panel controller is utilized for recognizing handwritten characters applied to the touch sensitive screen by the user. The panel controller facilitates editing of information retrieved from the fax controller by handwritten changes through the touch sensitive screen overlay.

The present apparatus by way of the structure disclosed herein provides multifunctional telecommunications capabilities. The present apparatus incorporates a scanner to send faxes, input the scanned information to a connected computer, or provide copier capability through a connected printer. The present apparatus is compatible with remote fax and personal computer terminals to send and receive information. A fax and data modem is incorporated to send and receive information to the remote fax and computer terminals. Electronic memory is utilized to store documents scanned before transmission and for unattended facsimile reception.

The present apparatus provides a user with multiple telecommunications functions with enhanced features and greater ease of use. Among the functions included are: broadcasting information received into or residing within the present apparatus to multiple locations of interconnected fax terminals, computers, printers; automatically extracting information from a remote fax terminal; interfacing with cordless and cellular telephones; digital voice answering machine capabilities, voice communication via a telephone handset or a simultaneous; two-way digital speaker phone system; interfacing to compatible printers; and, utilization of user friendly graphical screen icons and an on-screen instruction manual is provided by the control display 102 for ease of use.

The integrated electrophoretic display with touch sensitive screen provides enhanced viewing. The electrophoretic flat panel provides a capability of displaying an entire page of information in a single image. A reading capability similar to that of a printed page is realized with the flicker free, ultra-high resolution of the electrophoretic display. Information is easily readable from any direction, under sunlight or night time light conditions. An image can be retained on the display with minimal power consumption. A user is provided the capability of reading displayed information received from faxes, electronic mail, and editing by handwritten methods information on the display received via telephone, satellite or cellular links.

The electrophoretic display further provides enhanced user interactive capabilities with the various multifunctional capabilities of the present apparatus. With the use of a pressure point pen applied to the touch sensitive screen, handwriting can be viewed on the display. Handwritten information can be applied in any language and printed or transmitted to other fax terminals interconnected to the present apparatus. Received information can be displayed on the electrophoretic display and edited with the point pressure applying pen to be transmitted like ordinary fax information to other interconnected fax terminals, computers or printers. Documents simultaneously displayed on a plurality of the present apparatus, remote linked to communicate as in a teleconference situation, handwritten editing by one user can be transmitted via the scanning capabilities to update the image displayed in all the displays. Transmission speeds are optimized by only transmitting the edited portions of the document to only alter the pertinent portions of the document displayed for the other users. A touch sensitive keyboard image can be displayed for use with certain telephonic and fax functions and for additional capabilities with pagers and on-line services through Internet access.

BRIEF DESCRIPTION OF THE DRAWINGS

The invention will be better understood with reference to the following illustrative and non-limiting drawings, in which:

FIG. 9 details receipt of a fax message or computer message during a phone call in accord with the present apparatus.

FIG. 10 details transmission of a fax message during a phone call in accord with the present apparatus.

FIG. 11 details the steps for listening to voice messages received in accord with the present apparatus.

FIGS. 12–13 detail the steps for viewing fax messages received in accord with the present apparatus.

FIGS. 14–18 detail the steps for broadcast or polling in accord with the present apparatus.

FIGS. 19–20 detail writing a document in accord with the present apparatus.

FIG. 21–22 detail viewing computer messages received in accord with the present apparatus.

FIG. 23 details the scanner to computer function in accord with the present apparatus.

FIG. 24 details viewing and selecting the speed dialing directory.

FIGS. 25–26 detail use of the redial function when the last call was a voice call or fax call in accord with the present apparatus.

DETAILED DESCRIPTION OF THE INVENTION

In the present technology there are multifunctional telecommunications products with or without telephone operations integrated with various capabilities such as fax/data modem operations, copying, data storage and transmission, hardcopy scanning into electronic form, computer printing, and facsimile transmissions. However, these multifunctional devices do not provide operational capabilities through an integrated touch sensitive interface display facilitating user interaction. The preferred embodiment of the present invention is described with an interface display utilizing an electrophoretic display panel to provide a flicker free, ultra-high resolution display akin to that of a printed page.

Figure 1:
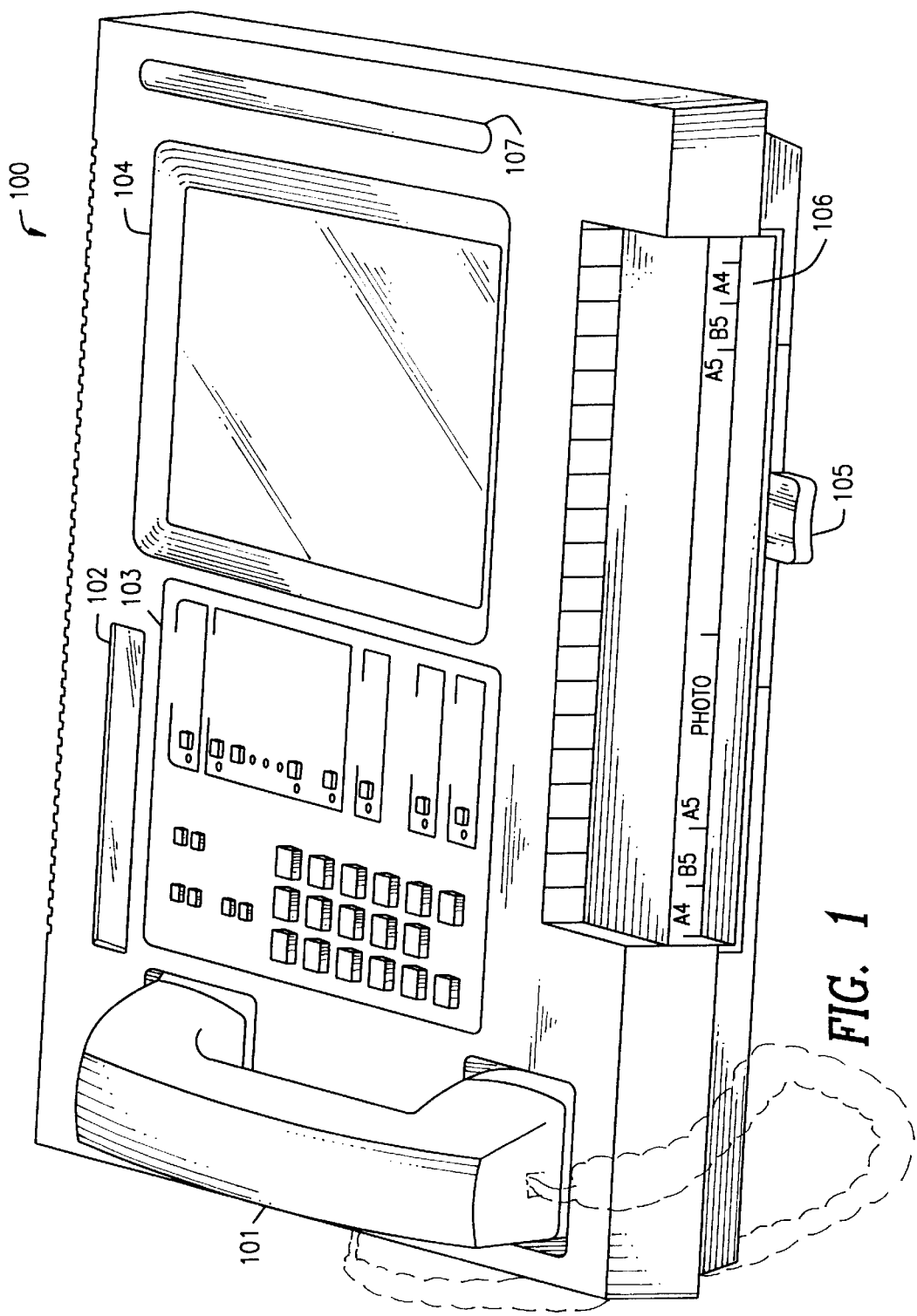
FIG. 1 is a top perspective view of a preferred telephone based multifunctional telecommunications apparatus according to this invention.

Referring now to FIG. 1 there is shown a top perspective view of a preferred telephone based multifunctional telecommunications apparatus 100 according to this invention. The apparatus includes a cord connected, telephone type handset 101 for voice communications over telephone networks. The control display 102 is preferably twenty four character, two line liquid crystal display (LCD). Liquid crystal displays are well known in the art. Various functions of the apparatus 100 are accessed and manipulated via the control panel section 103 discussed in greater detail with FIG. 2. Function setup instructions are available on a set of cards accessed by using lever 105. Paper for hardcopy output or scanning of documents is fed into the apparatus 100 through an input slot 106. The electrophoretic display or flat panel 104 includes a touch sensitive screen overlay which is manipulated by a pen type writing instrument 107 pressed against the screen overlay. The flat panel 104 is shown in FIG. 3 with an image of a QWERTY keyboard layout 301 which can be manipulated through the touch sensitive screen overlay for keyboard inputs to implement functions or operations by the apparatus 100.

Figure 2:
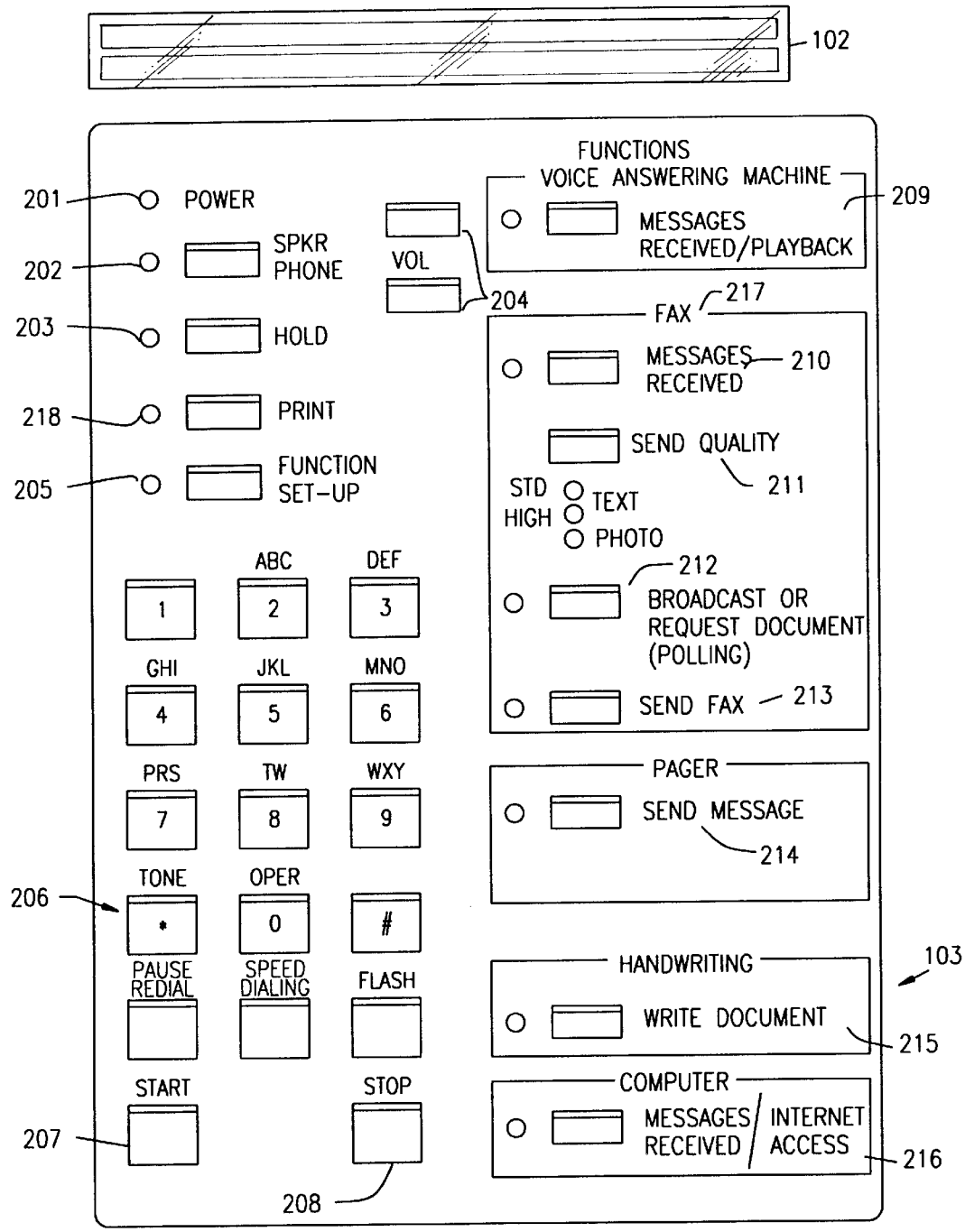
FIG. 2 is a detailed view of a control panel section of the multi-functional telecommunications apparatus of FIG. 1.
Figure 3:
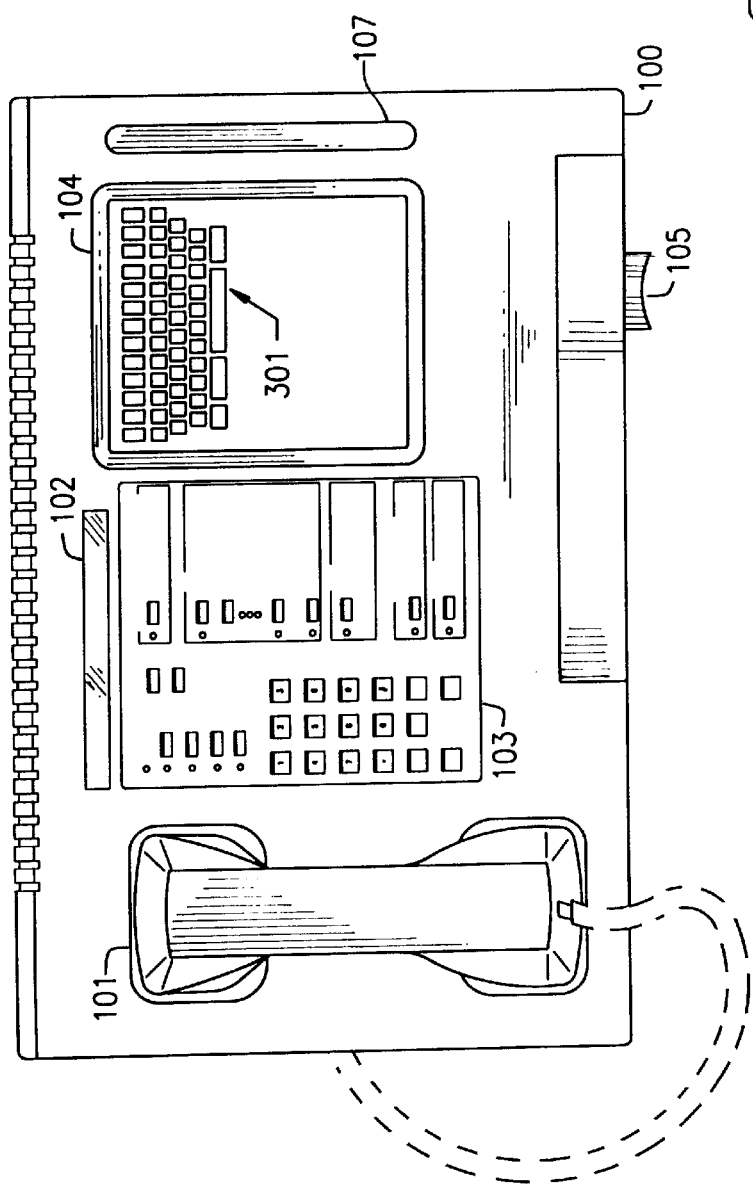
FIG. 3 is a top view of the multifunctional telecommunications apparatus of FIG. 1 with a QWERTY keyboard image in the electrophoretic display.

Referring now to FIG. 2 there is shown the control panel section 103 in greater detail. The control panel section 103 provides for manual power indicator 201 on/off capability, and conventional telephone related operations including speaker phone 202, hold 203, volume adjustment 204, touch tone dialing alphanumeric buttons 206, start 207 in conjunction with the alphanumeric buttons 206, and stop 208 function buttons. The function set-up 205 momentary push button provides for choosing one of the multiple functions available. The functions available through the function set-up key 205 and the alphanumeric keys 206 are: 1) Date Time, 2) Local ID (Phone Number), 3) Text Header (For example COPYTELE), 4) Voice Greeting, 5) Review Voice Greeting, 6) Speed Dialing, and 7) Enter Code For Remote Access.

Activating the voice answering machine function allows messages received to be played back. The fax function option includes viewing messages received 210, adjusting the send quality 211 of transmissions to either standard or high for text and photo quality, broadcasting or requesting documents (polling) 212, and sending a fax 213. The source of information for fax operations can be pages scanned into the apparatus, text handwritten onto the flat panel 104, or scanned text edited on the flat panel 104 by handwritten changes. The broadcast function 212 allows the apparatus 100 to transmit multiple pages to multiple selected recipient phone numbers. The handwriting function 215 provides for a hardcopy printing and/or transmission of handwritten text on the electrophoretic display 104. The computer function 216 provides for receiving messages over the Internet or other interconnected computers, such as electronic-mail messages, as well as functional access to the Internet or other interconnected computers.

Figure 4:
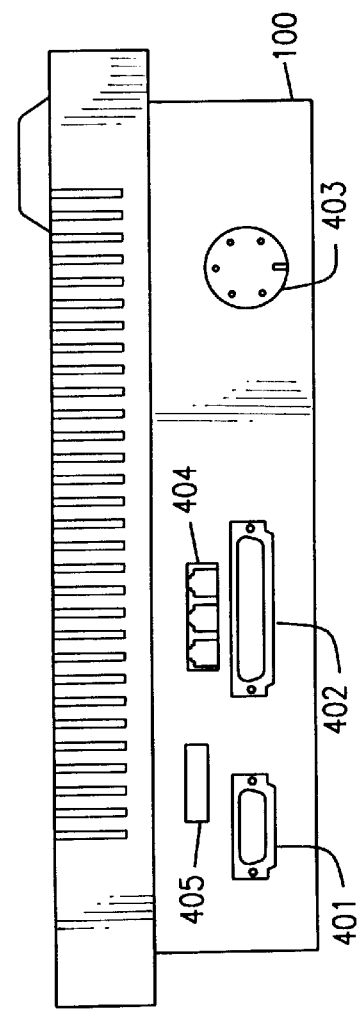
FIG. 4 is a rear view of the apparatus of FIG. 1 showing connection points to peripheral devices or systems.

Shown in FIG. 4 is a rear view of the present apparatus with connection points to peripheral devices or systems via connectors 401 through 405. Connectors 401, 402, 404, and 405 are, respectively, the serial port, parallel port, RJ11 telephone jacks, and cellular phone connections. These input and output connections to the present apparatus are used for computers, printers, fax machines, etc. The connector designated 403 is the power input from a brick power supply. Connections over telephone networks provide links to the Internet and other computers networked to telephone networks as well as to fax machines.

Figure 5:
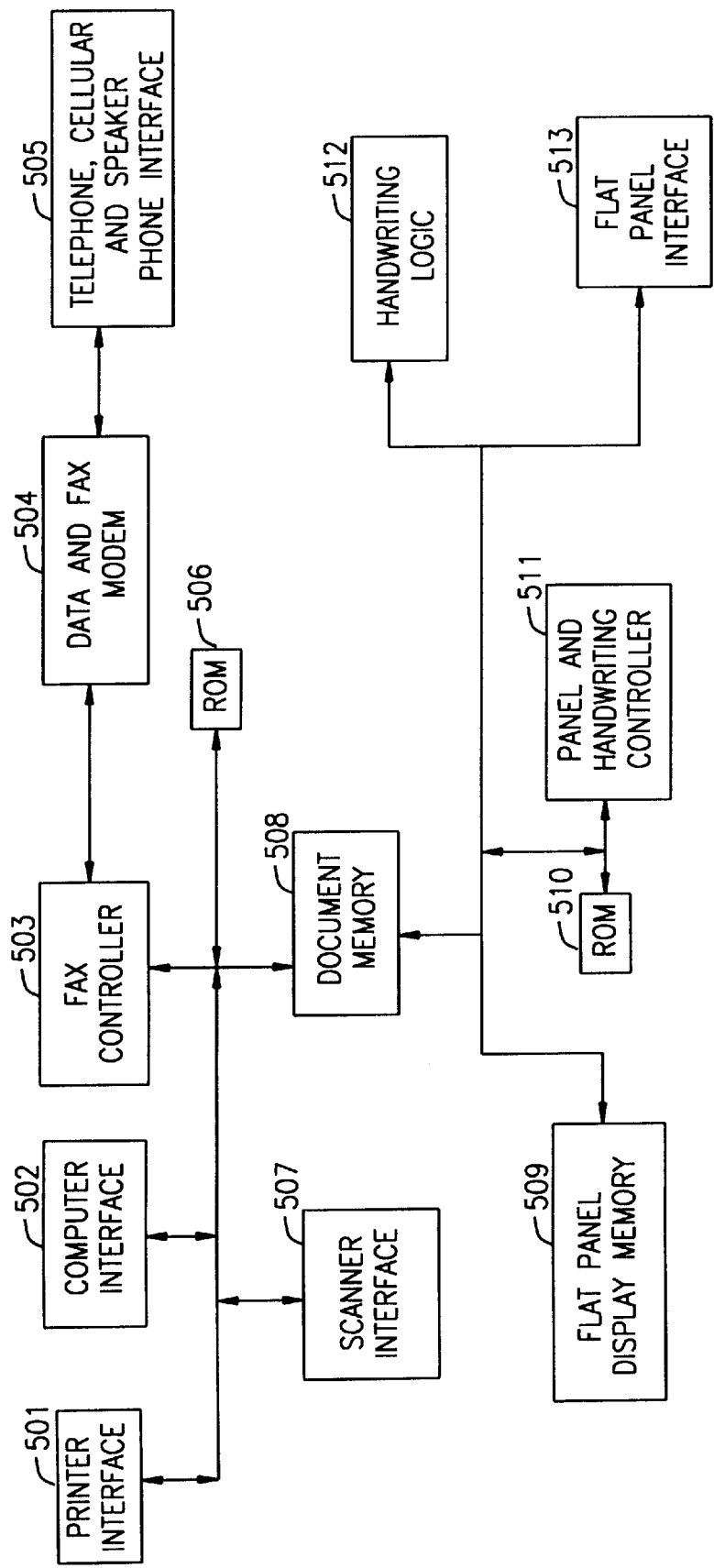
FIG. 5 is a block diagram showing interrelation between primary operational hardware specifics in the present invention.

Referring now to FIG. 5 there is shown a block diagram of the hardware components and their processing interconnections for implementing the primary functions of the present invention. Operation in conjunction with a printer 501 or a computer 502 is attained through either an RS-232 serial interface or a centronics parallel interface. An RS-232 interface is a well known industry interface standard for serial communications. Adopted by the Electrical Industries Association (EPA), the RS-232 standard defines the specific lines and signal characteristics used by serial communications controllers for transmission of serial data between devices. The centronics interface, a known standard for parallel data exchange paths between computers and peripherals, provides for eight parallel data lines plus additional lines for control and status information.

The flat panel 103 is coupled to the apparatus via a flat panel interface 513 which in turn is coupled to the handwriting logic 512 and the panel and handwriting controller 511, wherein both 511 and 512 are implemented by the Phillips 80C5520 display controller. The handwriting logic 512 provides signals representative of handwritten information sensed by the touch sensitive screen overlay. The panel and handwriting controller 511 receiving the signals to derive character information from the handwriting logic signals and may, depending on the apparatus functions being implemented, send the signals to the electrophoretic display through the flat panel interface 513, store the character information in the display memory for continuous display or send the character information to the document memory for further processing which may be through the printer interface 501, computer interface 502, scanner interface 507 and/or fax controller 503. Software configuring the panel and handwriting controller 511 functions resides in read only memory (ROM) 510 coupled to the panel and handwriting controller 511. Flat panel display memory 509 for maintaining a display of text or graphics is preferably static random access memory (SRAM) that is shared by other controllers or processors. An SRAM chip can store only about one fourth as much data as a dynamic random access memory (DRAM) chip of the same complexity, but SRAM does not require refreshing and is usually much faster than DRAM.

Fax operations are facilitated in part by a fax controller 503. A preferable commercially available fax controller is a Rockwell manufactured microcomputer 11561. Fax, an abbreviation for facsimile, is the transmission of text or graphics over telephone lines in digitized form. Fax operations entail scanning an original document, transmitting an image of the document as a bit map, and reproducing the received image on a printer. Fax transmission resolutions are selected by the send quality feature 211 for text at either standard quality at 100 dots per inch or high quality at 200 dots per inch, or photo quality for fine mode grey scale transmission. Fax images can also be sent and received by microcomputers equipped with fax hardware and driver software. For the present apparatus the fax controller's 503 driver software resides in read only memory (ROM) 506.

Document memory 508 for documents transferred from the electrophoretic display (flat panel) 103, or through the printer interface 501, computer interface 502, scanner interface 507, or fax controller 503 is provided by dynamic random access memory (DRAM) coupled to the fax controller 503, computer interface 502 and printer interface 501. Suitable DRAM is manufactured by Micron technology and available as stand alone memory chips in various capacities, or single in-line memory modules (SIMM). DRAM capacity is preferably one to twelve Megabytes. Coupling the document memory 508 in this manner provides for transmitting the flat panel generated documents to a printer for printing, to a computer for processing, or to the fax and data modem for transmission over the telephone network to a remote fax machine or computer. For certain editing situations such as when a document is simultaneously displayed on two or more units of the present apparatus, interactively linked via the telephone network, the fax controller with appropriate configuration software operates to optimally transmit only handwritten edited changes by one user to the other user to create the same document simultaneously displayed on the other unit.

For the present apparatus, fax operations over telephone based networks are provided by a fax modem 504, such as the Rockwell RFX96VL2-S23 which is a CCITT compliant fax modem. The transmission of bit mapped images stored in the apparatus over telephone based networks is provided by a data modem 504, such as the Rockwell RC224ATL data modem. Both the fax and data modems 504 are connected to telephone, cellular and speaker phone interface components of the present invention.

Bi-directional data flow and addressing between the hardware components facilitates various information transfers from and between the hardware components providing the present apparatus with multi-functional capabilities. The printer interface 501, computer interface 502, scanner interface 507, and flat panel display related hardware components 509, 510, 511, 512 and 513 are bi-directionally coupled through the fax controller 503 or document memory component 508 to permit several information processing functions. In addition the fax controller 503 through the data and fax modem 504 permits processing to telephone and cellular connected devices and networks. The scanner function of the apparatus can be used to send a fax through the fax controller 503, to input the scanned information through the computer interface 502 to a connected computer, or provide copier capability through the printer interface 501 to a connected compatible printer. The fax controller 503 provides a compatibility with fax and computer and personal computer terminals to send or receive information, a capability of transmitting any information generated by the touch sensitive screen, and a capability of interfacing with cordless and cellular telephones to send received or stored information over compatible wireless device networks.

Figure 6:
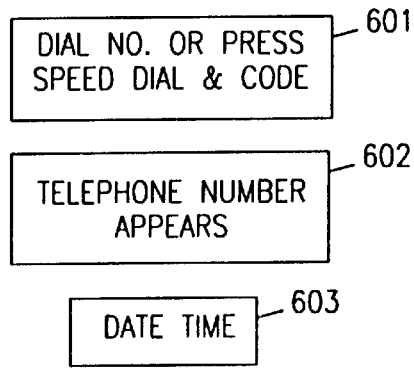
FIG. 6 details the voice call function in accord with the present apparatus.

The various telecommunications related functions of the present apparatus are illustrated in the block diagrams of FIGS. 6 through 29. The bordered blocks, such as blocks 601, 602 and 603, represent alphanumeric instructions or prompts by the control display 102, which is preferably a twenty four character, two line liquid crystal display (LCD). The procedures for making a typical voice call with the handset 101 off hook or speaker phone 202 being used are shown in FIG. 6. The control display 102 prompts the user to dial a phone number or press speed dial and a code for a stored phone number 601, whereupon, the telephone number dialed appears in the display panel 602, followed by a current date and time 603.

Figure 7:
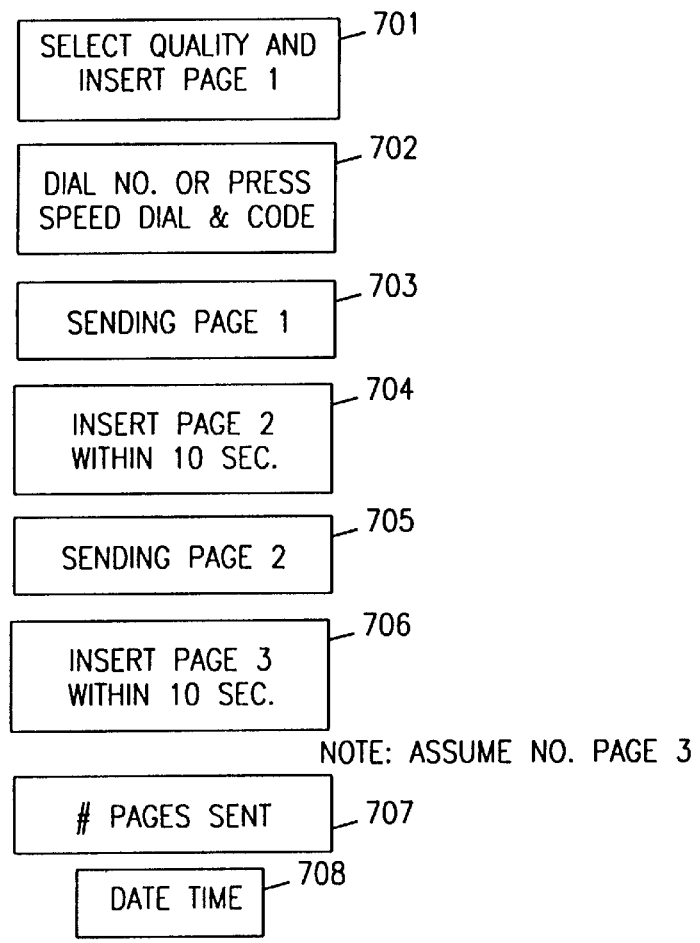
FIG. 7 details fax functions with the handset off hook or speaker phone being used in accord with the present apparatus.
Figure 8:
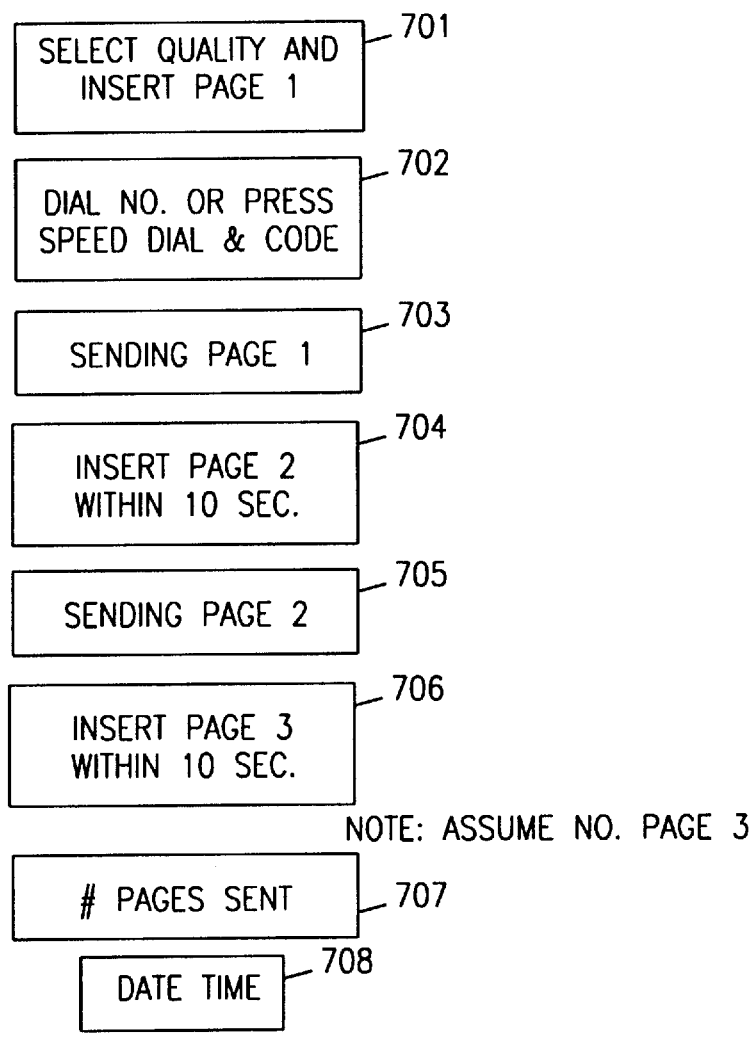
FIG. 8 details the fax function with the handset on hook in accord with the present apparatus.

Operating the present apparatus for sending a fax with the handset 101 off hook or the speaker phone 202 being used is shown in FIG. 7. The send fax 213 key is depressed and the control display 102 prompts for a selection of quality and insertion of a page 701. The user is then prompted to dial a phone number or press speed dial and a code for the number desired 702. Upon completion of sending page one (1) 703, the display prompts the user to insert page 2 within ten seconds 704, upon completion of sending the second page 705, the display prompts the user to insert the third page 706. When no more pages are being inserted for transmission the display indicates the number of pages sent 707 and displays the date and time 708. The procedures for sending a fax with the handset 101 on hook, as shown in FIG. 8 with the same steps as in FIG. 7 being like numbered, are identical to when the handset is off hook or the speaker phone is being used.

The present apparatus provides for receiving a fax message or computer message while a phone call is in progress in accord with the steps in FIG. 9. Upon pressing the start button 207 the display indicates the page number of the message being received 901. The apparatus, via the fax controller automatically detects whether a fax or computer message is being received. After reception of the message is complete the display indicates an end of fax or computer message 902. If the handset 101 is on hook the apparatus disconnects from the telephone line, and if the handset is off hook the apparatus sends a voice request to the sending end of the fax or computer message. Upon completion of receiving the fax or computer message the display prompts the user to hang up to end the voice conversation 903 and the date and time is displayed 904. In a teleconference situation with multiple users each viewing the same document with another apparatus 100, with handwritten editing by one user the fax controller only transmits the edited portions to the other users' apparatus to change the appropriate portions of the other displays of the document so that all users are viewing the same revised document. Transmitting in this manner, and not the entire document, facilitates shorter transmission times and a teleconference scenario more akin to face to face dialogue.

The present apparatus facilitates transmitting a fax message during a phone call to the other party of the phone call in accord with the steps in FIG. 10. Upon pressing send fax 213 the display prompts for a selection of send quality 211 and insertion of page one 1001. Upon completion of sending page one 1002 the user is prompted to insert page two within 10 seconds 1003. Upon completion of sending page two 1004, the user is prompted to insert page three within 10 seconds 1005, followed by an indication of the number of pages sent 1006 and the date and time 1007.

The present apparatus permits listening to voice messages received in accord with the steps of FIG. 11. The blinking red light emitting diode next to voice messages received informs the user that new voice messages are available. The user presses "voice messages received" 209 to begin. As each voice message is played, on the speaker if the handset is on hook or through the handset if the handset is off hook, the date and time the message was recorded is displayed 1101. After the last message is played the current date and time is displayed 1102.

A user may view received fax messages on the flat panel display, edit the fax message on the flat panel screen and fax and/or print the edited document in accord with the steps of FIGS. 12 and 13. A blinking red light next to fax "messages received" 210 informs the user that new fax messages are available for viewing. Upon pressing "messages received" the entire document appears on the flat panel screen 103. The display requests if the page is to be inverted 1201 and whether the page is to be edited 1202. If editing is desired the display prompts the user to use the supplied pen to edit 1203 and press "*" when editing is completed 1204. The user can fax the edited page 1205 by pressing "1", entering the fax number and then pressing start 1206. The user may also print the edited document 1207 by inserting paper and pressing print (218) 1208. To continue viewing more pages of the faxed message the user presses message received and repeats the above procedures for editing, faxing and printing the edited page. When all the pages have been viewed the display shows the current date and time.

Figure 14:
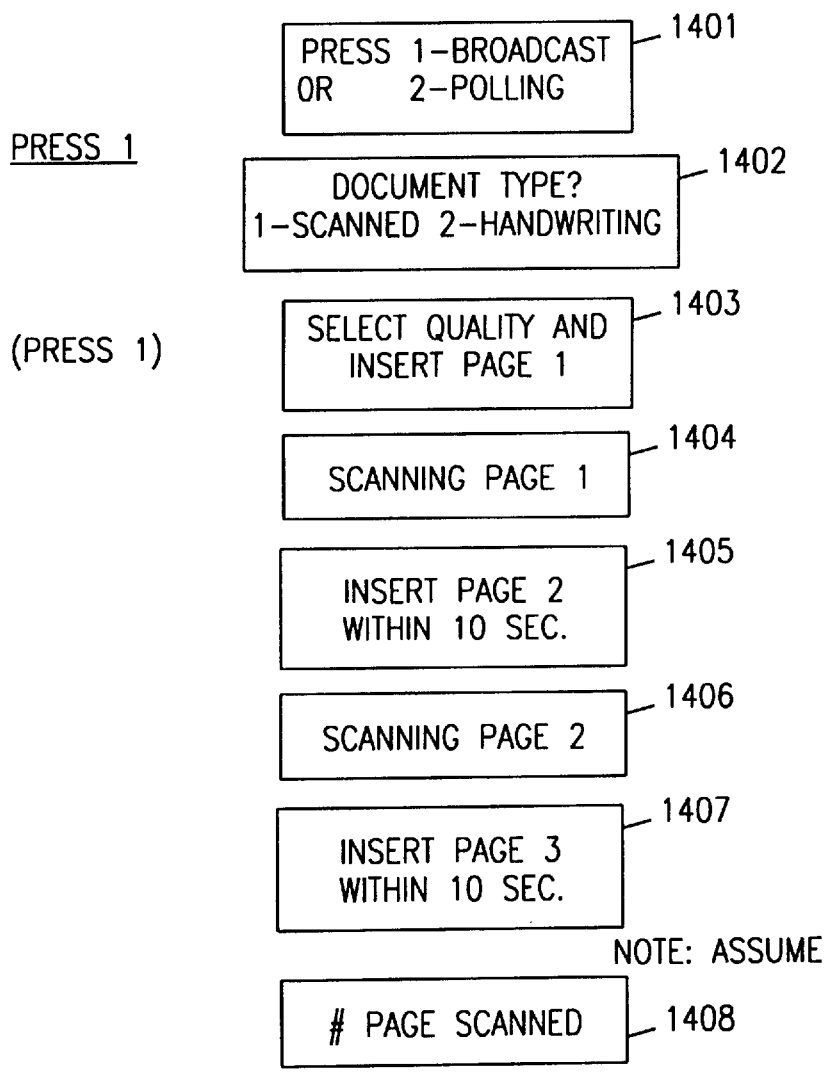
Figure 15:
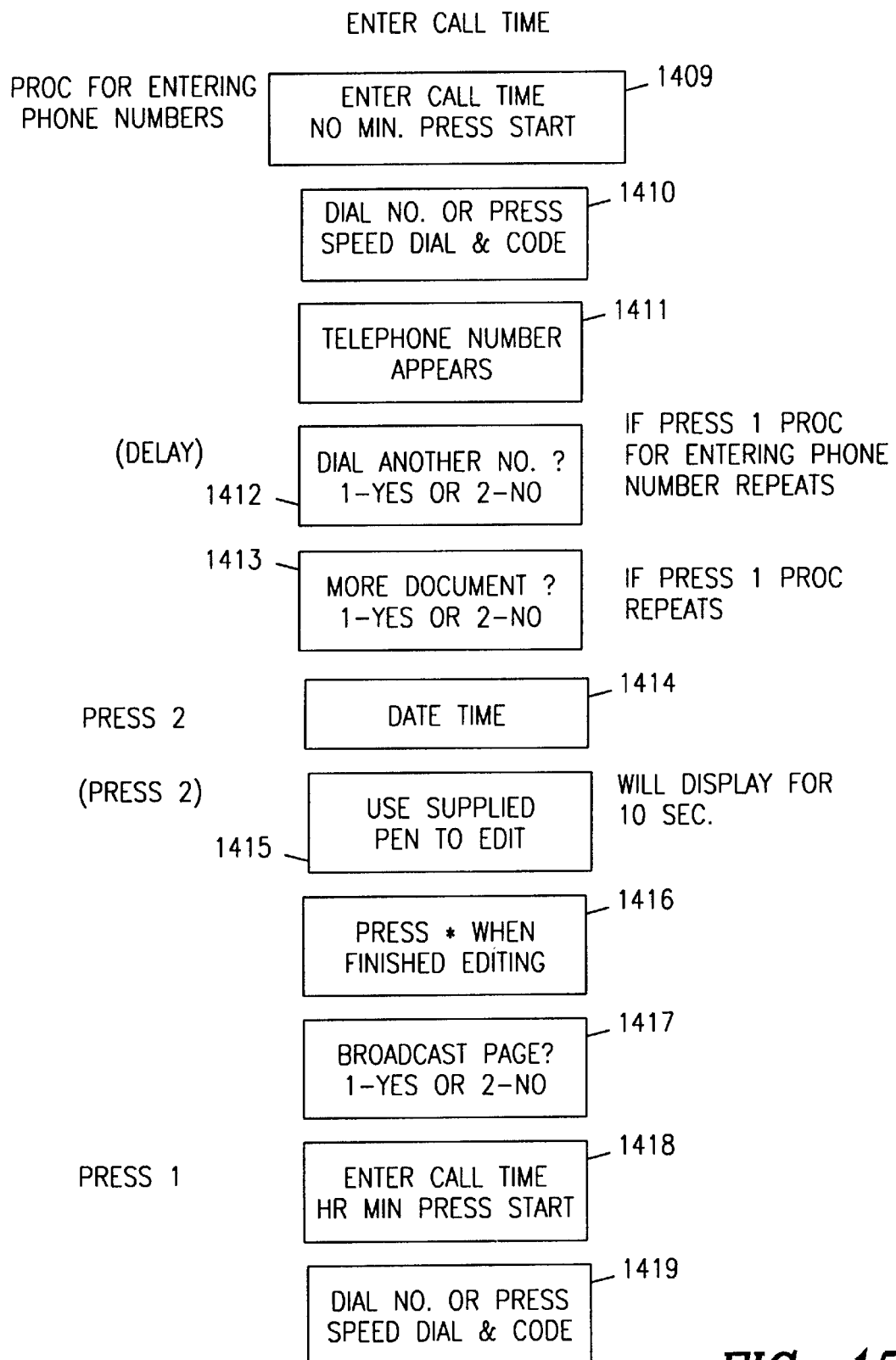
Figure 16:
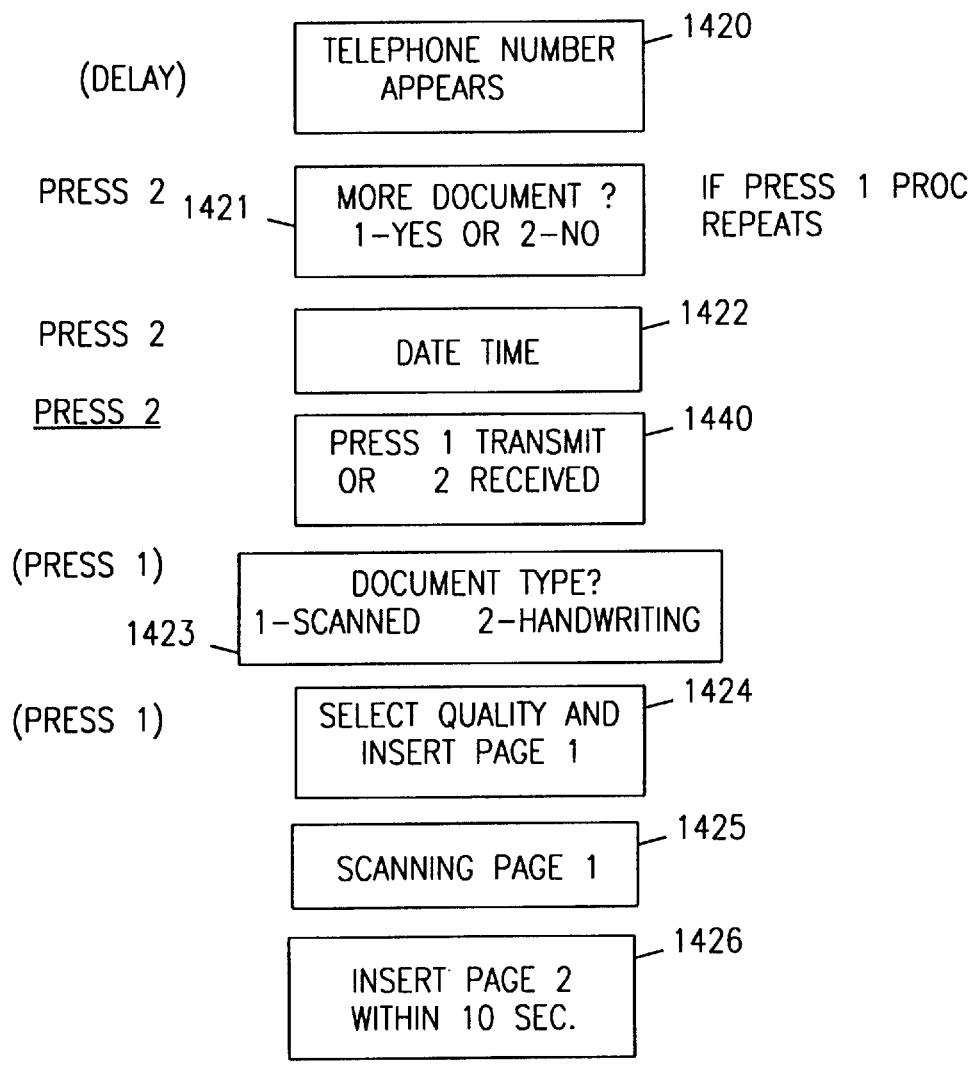
Figure 17:
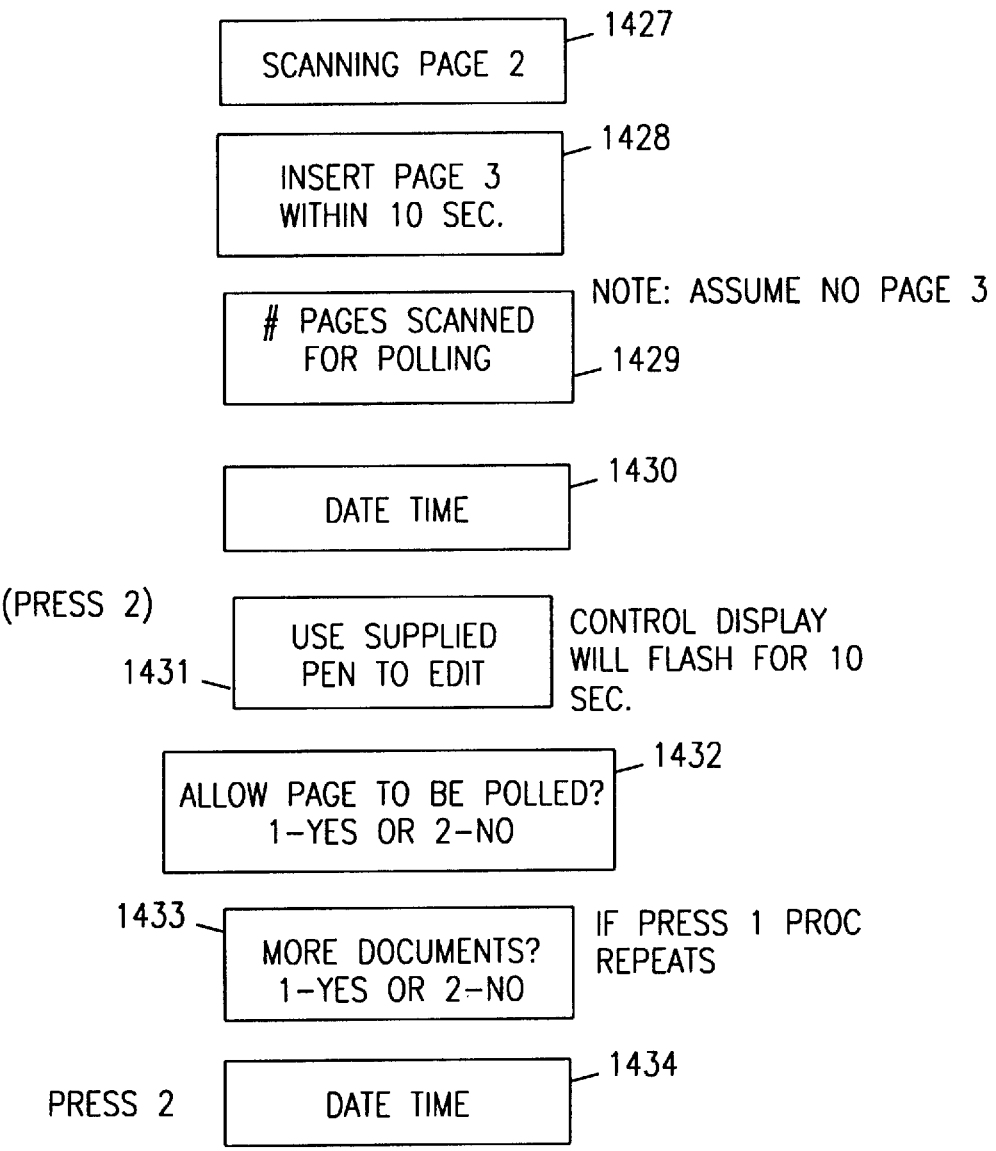

The user may broadcast a transmission to several recipients without having to repeatedly prepare the document for each recipient in accord with the steps of FIGS. 14–16. The user presses broadcast or request document 212 and the appropriate broadcast related display appears 1401, whereupon the user confirms broadcast operation (PRESS 1) and indicates whether the source of the transmission is a scanned document or handwritten 1402 on the display 104. With a scanned document the user selects the quality and inserts pages 1, 2 or 3 etc. in response to display prompts 1403, 1405 and 1407, in conjunction with display prompts 1404, and 1406 indicating the page being scanned. Upon completion of scanning the document the number of pages scanned 1408 are indicated. The user is then prompted to enter the desired call time 1409, and next selects direct dialing or speed dialing 1410 with a display of the number being dialed 1411. The display prompts the user for more telephone numbers 1412 and then prompts whether more documents are to be scanned 1413. Upon completion the date and time appear 1414.

When for broadcast operations the user specifies a handwritten source 1402 (PRESS 2) the display prompts the user to use the supplied pen on the flat panel display 1415 and press "*" 1416 when editing is completed. When the user indicates a broadcast of the edited handwritten page 1417 (PRESS 1) a call time prompt is displayed followed by press start 1418. The prompt then requests a telephone number 1419. The display panel indicates the telephone number dialed 1420 followed by a request if more documents are to be broadcast 1421. If 2 is pressed the display indicates current date and time 1422.

Rather than broadcast transmissions, the user may select polling 1401 (PRESS 2). The user may select transmit 1440 (PRESS 1). If the user indicates a scanned document 1423, quality is selected and pages are inserted 1424, 1426 and 1428, in conjunction with display indications showing the pages are being scanned 1425, 1427 and 1429, followed by a display of the date and time 1430. If a handwritten source document is selected 1423 (PRESS 2) the display prompts use of the pressure pen 107 to edit 1431. When the written document is complete (PRESS "*") the prompt asks if the document is allowed to be polled 1432. The prompt then asks if there are more documents 1433. If 2 is pressed 1433 then the date and time is displayed 1434. If receive is selected (PRESS 2) 1440, the display prompts for entry of a telephone number or speed dial with a code 1435. The telephone number dialed is displayed 1436 followed by a prompt to enter a call time and press start 1437. If no further documents are to be polled 1438 the date and time is displayed 1439, otherwise the above procedure is repeated as appropriate.

Figure 20:
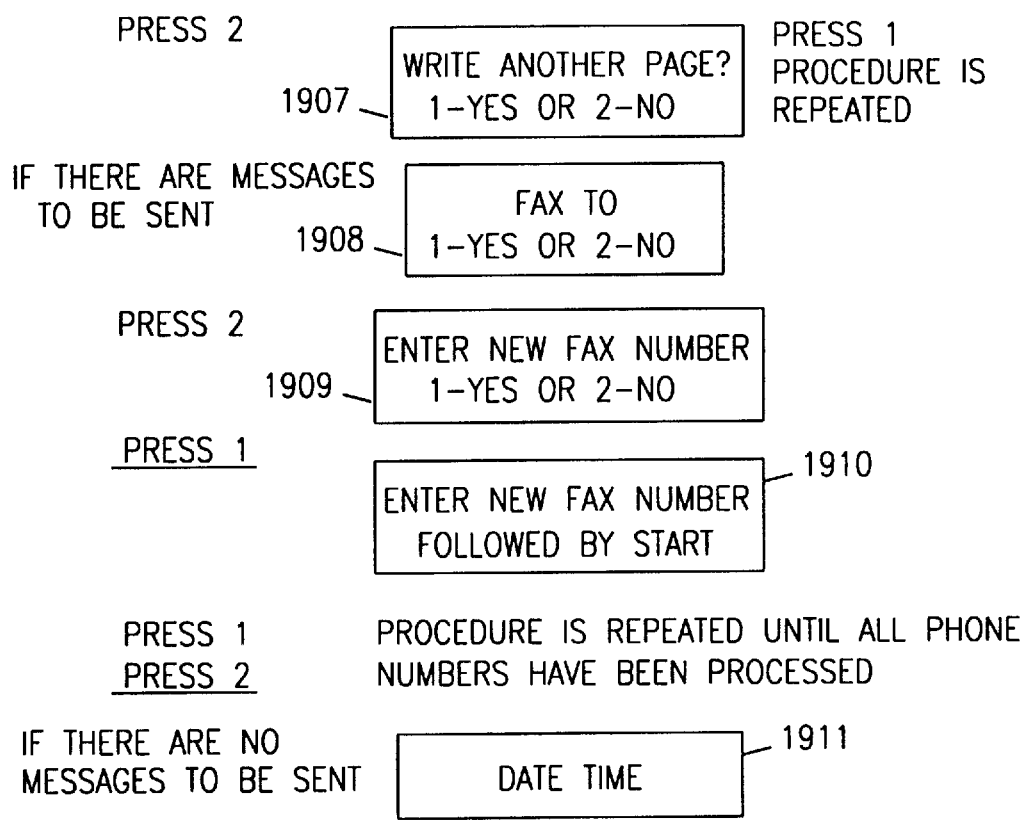

To write a document in accord with the steps in FIGS. 19 through 20, the user begins by pressing "write document" 215. The display prompts use of the editing pen 1901 for writing and requests the user to press "*" when finished editing 1902. The user then has the choice of faxing the written page 1903 by entering the fax number and pressing start 1904, and/or printing the handwritten page by pressing "1" 1905 and inserting paper and pressing print (218) 1906. If the user indicates no to the print page prompt 1905, the display prompts whether another page is to be written 1907 and requests if there are messages to be sent 1908. If 2 is pressed 1908, a new fax number is requested 1909. If 1 is pressed 1909 a new fax number is requested 1910. The procedure is repeated until all phone numbers have been processed, otherwise the date and time is displayed 1911.

Figure 22:
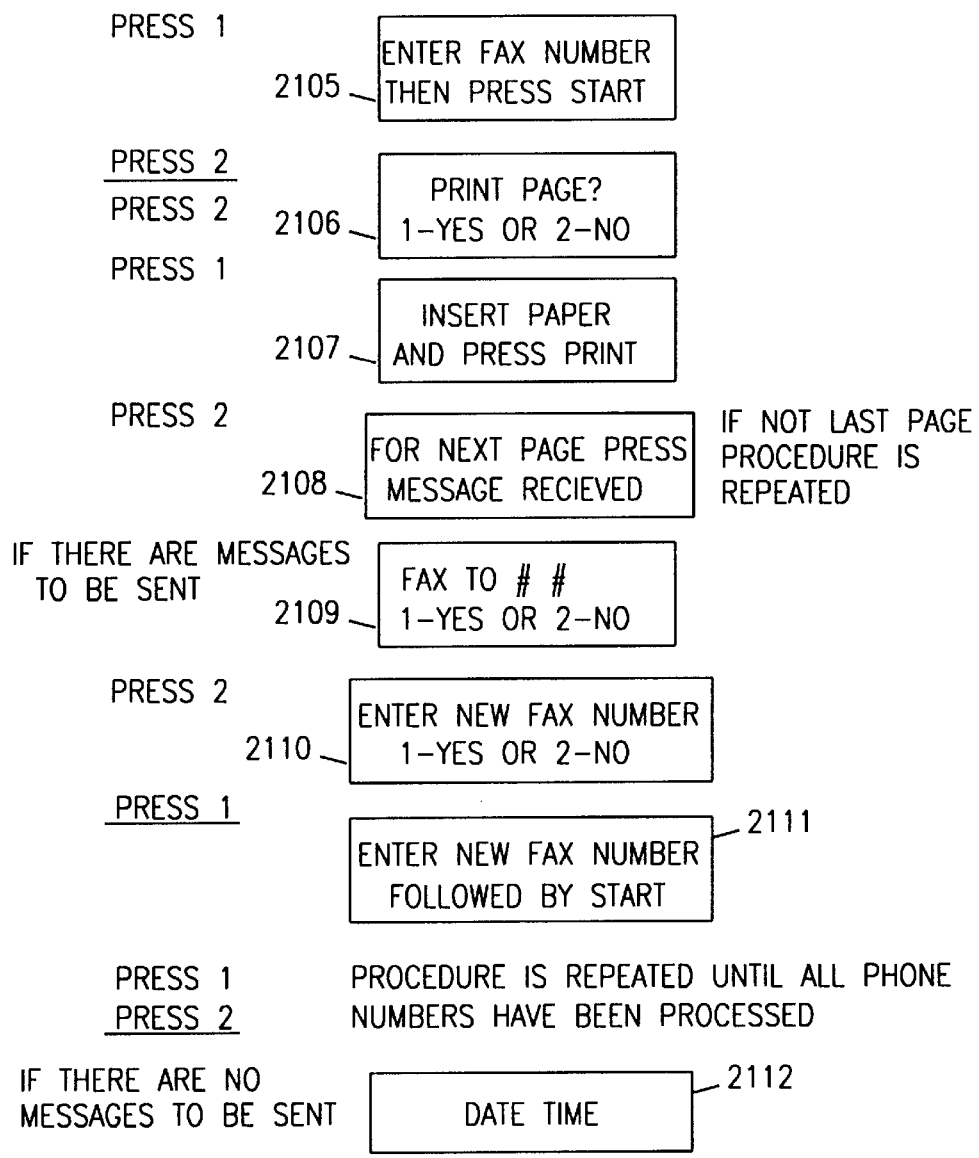

The present apparatus permits viewing of computer messages which were received in bit map or ASCII code format in accord with the steps of FIGS. 21 and 22. A blinking red light next to "computer messages received" 216 informs the user that new computer messages are available for viewing. Upon pressing "computer messages received" 216 the entire document appears on the flat panel display screen 104. If the user indicates that the page is to be edited 2101 the display prompts use of the supplied pen 107 to edit 2102, followed by a prompt to press "*" when completed 2103. If the user wishes to fax the edited page, a fax number is entered 2105 in response to the display prompt for faxing the page 2104. The display then asks if the user wishes to print the page 2106. To print the page the user responds appropriately 2106, inserts paper 2107 and presses print 218. The display prompts whether to repeat for the next page of the received message stored in memory 2108, whereupon the user presses "messages received" 216 and the above steps are repeated for this new page. Upon completing reviews or edits of messages received the user may fax the messages 2109 by responding appropriately 2110, and entering a fax number as required 2111 followed by pressing start 207. The date and time are displayed 2112 when all the phone numbers have been processed.

Documents are scanned with the present apparatus and transmitted to a computer in accord with the steps of FIG. 23. To facilitate scanner to computer transmission the computer must be attached to a scanner port connector shown in FIG. 4 and the computer must execute driver software to implement transmission from scanner to computer. Such driver software is well known in the art and need not be discussed in detail herein. Upon executing the driver software in the computer the present apparatus display instructs insertion of pages 2301, 2303 and 2305 with indications when the pages are being scanned 2302, 2304, and 2306. Upon completion the date and time are displayed 2307.

The present apparatus permits the user to view the speed dialing directory in accord with FIG. 24, wherein the user presses "speed dialing" when the phone is not in use and the display indicates "PRINTING" 2401. The "SPEED DIALING DIRECTORY" is printed and the display returns to the current date and time 2402.

The redial function may be operated when the last call was a voice call, FIG. 25, or when the last call was a fax call, FIG. 26. For the voice call situation, pressing redial 206 prompts the last phone number dialed to appear on the display 2501 followed by the date and time 2502. For the fax call situation, the display prompts selection of fax quality 2601 and insertion of the first page, last phone number dialed 2602 appears on the display, and prompts for insertion of remaining pages 2604 and 2606 are displayed with indications of the pages being sent 2603, 2605 and 2607. The redial session ends with a display of the date and time 2608.

It should be understood that the embodiment described herein is merely exemplary and that a person skilled in the art may make many variations and modifications to this embodiment utilizing functionally equivalent elements to those described herein. Any and all such variations or modifications as well as others which may become apparent to those skilled in the art, are intended to be included within the scope of the invention as defined by the appended claims.

What is claimed is:

1. A multifunctional telecommunications apparatus comprising:

display means for displaying predetermined information processed by said multifunctional telecommunications apparatus and for user interactive control of predetermined functions of said multifunctional telecommunications apparatus, said display means including a touch sensitive screen overlay on a viewing display for said user interactive control and a control display for providing a user interface for sending and receiving control and data information corresponding to actions performed on said touch sensitive screen overlay and to said user-interactive control;

memory means for storing predetermined information facilitating said predetermined functions, said memory means being coupled to said display means;

fax controller means for processing facsimile operations by said multifunctional apparatus, said fax controller means being configured by instruction sets stored in a second memory means responsive to said fax controller means, said fax controller means being coupled to said display means and said memory means;

fax and data modem means for converting predetermined information from said multifunctional telecommunications apparatus to a predetermined format for transmission across other networks and converting information coming to said multifunctional telecommunications apparatus across said other networks to a format compatible with said multifunctional telecommunications apparatus, said fax and data modem means being coupled to said fax controller means; and, external interface means for connecting said multifunctional telecommunications apparatus to said other networks, said external interface means being coupled to said fax and data modem means, said apparatus operable such that for a situation where a plurality of users are interactively coupled and viewing the same document on a display of another said multifunctional telecommunications apparatus, when one of said plurality of users makes handwritten editing to said same document said fax controller means transmits only said handwritten editing to each said display of another said multifunctional telecommunications apparatus for having said plurality of users viewing the same revised said same document.

2. The multifunctional telecommunications apparatus according to claim 1, wherein said viewing display is an electrophoretic display.

3. The multifunctional telecommunications apparatus according to claim 1, further including scanning interface means for introducing printed information into said multifunctional telecommunications apparatus, said scanning interface means being coupled to said memory means and said fax controller means.

4. The multifunctional telecommunications apparatus according to claim 3, further including printer interface means for coupling said multifunctional telecommunications apparatus to a predetermined printer, said printer interface means being coupled to said scanning interface means, said memory means and said fax controller means.

5. The multifunctional telecommunications apparatus according to claim 4, further including computer interface means for coupling said multifunctional telecommunications apparatus to a predetermined computer, information being exchanged with said predetermined computer in one of bit map or ASCII code format, said computer interface means being coupled to said scanning interface means, said memory means, said printer interface means and said fax controller means.

6. The multifunctional telecommunications apparatus according to claim 1, further including said display means, said memory means and said fax controller means cooperating for sending information handwritten on said touch sensitive screen overlay to said fax and data modem means for transmitting to said any one of a plurality of external recipients.

7. The multifunctional telecommunications apparatus according to claim 1, further including said display means, said memory means and said fax controller means cooperating for permitting handwritten editing through said display means of information received over said fax and data modem means and transmitting the edited information over said fax and data modem means.

8. The multifunctional telecommunications apparatus according to claim 4, further including said display means, said memory means and said printer interface means cooperating for sending information handwritten on said touch sensitive screen overlay to said predetermined printer for printing.

9. The multifunctional telecommunications apparatus according to claim 1, further including said memory means, said fax controller means and said fax and data modem means cooperating for unattended reception of information over said fax and data modem means to said fax controller means.

10. The multifunctional telecommunications apparatus according to claim 1, further including said memory means and said fax controller means cooperating for broadcasting information stored in said memory means to multiple locations including remote computers and fax terminals.

11. The multifunctional telecommunications apparatus according to claim 1, further including said display means, said fax controller means and said external network interface means cooperating for operation of said multifunctional apparatus through said display means for transmitting predetermined information through at least one of on-line services, and cellular telephone communications coupled to said external interface means.

12. The multifunctional telecommunications apparatus according to claim 1, further including said display means, said fax controller and said external network interface means cooperating for operation of said multifunctional apparatus for viewing and editing with said touch sensitive screen overlay predetermined information received through at least one of on-line services, and cellular telephone communications coupled to said external interface means.

13. The multifunctional telecommunications apparatus according to claim 1, further including said fax controller means and said fax and data modem means cooperating for at least one of sending and receiving predetermined information to at least one of remote fax and computer terminals coupled to said external interface means.

14. The multifunctional telecommunications apparatus according to claim 1, further including said scanner interface means, said fax and data modem means and said external interface means cooperating for automatically extracting predetermined information from a remote fax terminal networked to said external interface means.

15. The multifunctional telecommunications apparatus according to claim 1, further including means for telephone operations including at least one of digital voice answering machine operations, voice communication with a handset, and voice communication with two way speaker phone operations.

16. The multifunctional telecommunications apparatus according to claim 1, further including said display means displaying screen icons and an on-screen instructional manual for facilitating said predetermined functions.

17. The multifunctional telecommunications apparatus according to claim 1, wherein said display means includes flat panel interface means for coupling said electrophoretic display to said multifunctional telecommunications apparatus.

18. The multifunctional telecommunications apparatus according to claim 17, wherein said display means includes handwriting logic means for generating signals representative of said handwritten information on said touch sensitive screen overlay on said electrophoretic display and, said handwriting logic being coupled to said flat panel interface means and said memory means.

19. The multifunctional telecommunications apparatus according to claim 18, wherein said display means includes panel and handwriting control means for processing said signals representative of said handwritten information to said memory means, said panel and handwriting controller means being configured by predetermined software residing in non-volatile memory coupled to said panel and handwriting controller for recognizing character information in said handwritten information, said panel and handwriting controller means being coupled to said memory means, said handwriting logic means and said flat panel interface means.

20. The multifunctional telecommunications apparatus according to claim 19, wherein said display means includes display memory means for storing information representative of a display image on said electrophoretic display, said display memory means being coupled to said memory means, said panel and handwriting controller means, said flat panel interface means, and said handwriting logic means.

21. The multifunctional telecommunications apparatus according to claim 3, further including said memory means, said scanning interface means and said fax controller means cooperating to scan information from documents before transmission of said information from documents.

22. The multifunctional telecommunications apparatus according to claim 3, further including said scanner interface, said memory means and said fax controller means cooperating for copier operations with said predetermined printer coupled to said printer interface means.

23. A method for providing interactive operation of a multifunctional telecommunications apparatus comprising the steps of:

providing a display having a touch sensitive screen overlay on a viewing display for receiving predetermined user inputs manipulating predetermined functions of said telecommunications apparatus and a control display for providing a user interface for sending and receiving control and data information corresponding to actions performed on said touch sensitive screen overlay and to said user inputs;

storing into electrical memory information related+to said predetermined functions, said electrical memory being influenced by said display;

providing facsimile operations by a fax controller influenced in part by at least one of said display and said electrical memory;

scanning documented information for influencing at least one of said facsimile operations and said electrical memory, said scanning being influenced by said fax controller;

transmitting information from said fax controller across interconnected networks to predetermined destinations, said interconnected networks being coupled to a network interface of said multifunctional apparatus, said network interface being coupled to said fax controller, including sending handwritten information through said touch sensitive screen overlay to said fax controller for transmission to one of said predetermined destinations, wherein said fax controller for a situation where a plurality of users are interactively coupled and viewing the same document on a display of another said multifunctional telecommunications apparatus and one of said plurality of users makes handwritten editing to said same document, said fax controller transmitting only said handwritten editing to each said display of another said multifunctional telecommunications apparatus for having said plurality of users viewing the same revised said same document; and, receiving information to said fax controller across said interconnected networks from predetermined sources.

24. The method according to claim 23, further including the step of operating said multifunctional telecommunications apparatus with at least one of graphical icons and an instructional manual displayed by said electrophoretic display and influenced by said predetermined user inputs through said touch sensitive screen overlay.

25. The method according to claim 23, wherein said viewing display is an electrophoretic display.

26. The method according to claim 25, further including the step of influencing by said fax controller a printer coupled to a printer interface of said multifunctional telecommunications apparatus, said printer interface being coupled to said fax controller.

27. The method according to claim 26, further including the step of influencing by said fax controller a computer coupled to a computer interface of said multifunctional telecommunications apparatus, said computer interface being coupled to said fax controller, and said computer providing information in one of a bit map and an ASCII code format.

28. The method of claim 26, further including the step of producing copies by said printer of said documented information from said step of scanning.

29. The method of claim 26, further including printing handwritten information on said electrophoretic display with said printer.

30. The method according to claim 23, further including the step of permitting through said touch sensitive screen overlay handwritten editing of said information received to said facsimile operations across said interconnected networks and transmitting the edited information by said fax controller across said interconnected networks to said predetermined destinations.

31. The method according to claim 23, wherein said fax controller permits unattended reception of information from across said interconnected networks from said predetermined sources.

32. The method according to claim 23, further including the step of broadcasting information stored in said electrical memory to said predetermined destinations.

33. The method according to claim 23, further including the step of controlling transmission of predetermined information through at least one of on-line services, and cellular telephone communications through said network interface.

34. The method according to claim 23, further including the step of editing with handwritten inputs to said touch sensitive screen overlay predetermined information received from at least one of on-line services, and cellular telephone communications sources, said predetermined information being viewed on said electrophoretic display and altered by handwritten inputs to said touch sensitive screen overlay.

35. The method according to claim 23, further including the step of at least one of sending and receiving predetermined information to at least one of remote fax terminals and computer terminals connected to said external interface.

36. The method according to claim 23, further including the step of extracting automatically into said multifunctional telecommunications apparatus predetermined information from a remote fax terminal coupled to said network interface.

37. The method according to claim 23, further including the step of providing at least one of voice answering machine capabilities, voice communications with a handset, and voice communications with two way speaker phone operations.

38. The method according to claim 25, wherein said display further includes handwriting logic hardware for interpreting handwritten information on said touch sensitive screen overlay and generating signals representative of said handwritten information, said handwriting logic being coupled to said electrophoretic display through a flat panel interface.

39. The method of claim 38, wherein said display further includes a panel and handwriting controller for processing said signals representative of said handwritten information, said panel and handwriting controller being configured by predetermined software residing in nonvolatile memory coupled to said panel and handwriting controller.

40. The method of claim 39, wherein said display further includes another electrical memory for storing information representative of an image for said electrophoretic display.

41. A method for interactively operating a multifunctional telecommunications apparatus having predefined telephonic, scanning and facsimile capabilities comprising the steps of:

viewing information related to said telephonic, scanning and fax capabilities with a viewing display, said viewing display, said telephonic, scanning and facsimile capabilities being responsive to one another;

influencing said information received from said telephonic, scanning and facsimile capabilities on said viewing display through a touch sensitive screen overlay on said viewing display, said touch sensitive screen overlay, said viewing display and said telephonic, scanning and facsimile capabilities being responsive to one another, including processing said information handwritten on said touch sensitive screen overlay through said facsimile capabilities; and, interpreting with a handwriting processor handwritten information applied to said touch sensitive screen overlay for said step of influencing said information received from said telephonic, scanning and facsimile capabilities, said handwriting processor and said touch sensitive screen and said viewing display being responsive to one another, wherein for a situation where a plurality of users are interactively coupled and viewing the same document on a display of another said multifunctional telecommunications apparatus and one of said plurality of users makes handwritten editing to said same document, transmitting only said handwritten editing to each said display of another said multifunctional telecommunications apparatus for having said plurality of users viewing the same revised said same document.

42. The method according to claim 39, wherein said telephonic capabilities include at least one of digital voice answering machine, voice communication with a handset, and voice communication with two way speaker phone operations.

43. The method according to claim 39, wherein said display includes graphical icons and an on-screen instructional manual for facilitating said method, said screen icons and said instructional manual being influenced by user inputs through said touch sensitive screen overlay.

44. The method of claim 39, wherein said scanning capabilities and said interface capabilities to a compatible printer cooperate to provide copier capabilities.

45. The method according to claim 44, wherein said viewing display is an electrophoretic display.

46. The method according to claim 44, wherein said multifunctional telecommunications apparatus further includes interface capabilities to a compatible printer.

47. The method according to claim 46, wherein said multifunctional telecommunications apparatus further includes interface capabilities to a remote computer for exchanging information with said computer in one of a bit map format and an ASCII code format.

48. The method according to claim 47, wherein said interface capabilities to a remote computer include sending information from said facsimile capabilities to said remote computer.

49. The method according to claim 46, wherein said facsimile capabilities include unattended facsimile reception.

50. The method according to claim 46, wherein said facsimile capabilities include broadcasting predetermined information to multiple recipients.

51. The method according to claim 46, wherein said multifunctional telecommunications apparatus further includes additional interface capabilities to at least one of on-line services, and cellular telephone communications, said step of influencing including information related to said additional interface capabilities, said additional interface capabilities and said telephonic, scanning and facsimile capabilities being responsive to one another.

52. The method according to claim 46, wherein said facsimile capabilities include automatically extracting predetermined information from a remote fax terminal.

53. A telecommunications apparatus for fax, voice, computer, and copier operations comprising:

a prompting display providing a user with commands pertaining to said fax, voice, computer, and copier operations, said prompting display being responsive to said fax, voice, computer, and copier operations via an operator panel interface and an interface display; and, said interface display indicative of responses by said user to said prompting display, said interface display being responsive to and influencing said prompting display and said fax, voice, computer and copier operations.

54. The telecommunications apparatus of claim 53, wherein said prompting display provides commands for transmitting a fax with a handset on hook and said interface display indicating responses by said user to the commands by said prompting display.

55. The telecommunications apparatus to claim 53, wherein said prompting display provides commands for transmitting a fax with one of a handset off hook and a speaker phone being used, and said interface display indicating responses by said user to the commands by said prompting display.

56. The telecommunications apparatus of claim 53, wherein said prompting display provides commands for utilizing a redial function when the last phone call was one of a voice call and a fax call.

57. The telecommunications apparatus of claim 53, wherein said prompting display provides commands for making a voice call with one of a handset off hook and a speaker phone being used by said user, and said interface display indicating responses by said user to said commands.

58. The telecommunications apparatus of claim 53, wherein said prompting display provides commands for transmitting a fax message during a phone call and said interface display indicates responses by said user to said commands.

59. The telecommunications apparatus according to claim 53, wherein said interface display includes an electrophoretic display with a touch sensitive screen overlay for responses by said user to the commands by said prompting display.

60. The telecommunications apparatus of claim 53, wherein said prompting display provides commands for one of receiving a fax message and a computer message during a phone call and said interface display indicates responses by said user to the commands by said interface display.

61. The telecommunications apparatus of claim 59, wherein said prompting display provides commands for broadcast operations with one of scanned and handwritten information, said touch sensitive screen overlay providing said user with handwritten capabilities for said scanned and handwritten information, and said interface display indicating responses by said user to said commands and said touch sensitive screen overlay.

62. The telecommunications apparatus of claim 59, wherein said prompting display provides commands for polling operations with one of scanned and handwritten information, said touch sensitive screen overlay providing said user with handwritten capabilities for said scanned and handwritten information, and said interface display indicating responses by said user to said commands and said touch sensitive screen overlay.

63. The telecommunications apparatus of claim 59, wherein said prompting display provides commands for viewing computer messages received from a remotely coupled computer, said touch sensitive screen overlay facilitating handwritten editing of said computer messages, and said interface display indicating responses by said user to the commands by said prompting display and the handwritten editing of the computer messages.

* * * * *